(12) United States Patent
Delange et al.

(10) Patent No.: US 10,156,128 B2
(45) Date of Patent: *Dec. 18, 2018

(54) COUPLINGS FOR EXPANDABLE TUBULAR

(71) Applicant: WEATHERFORD TECHNOLOGY HOLDINGS, LLC, Houston, TX (US)

(72) Inventors: Richard W. Delange, Kingwood, TX (US); Scott H. Osburn, Conroe, TX (US); Syed Hossain, Spring, TX (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/592,642

(22) Filed: May 11, 2017

(65) Prior Publication Data

US 2017/0314371 A1 Nov. 2, 2017

Related U.S. Application Data

(63) Continuation of application No. 14/209,297, filed on Mar. 13, 2014, now Pat. No. 9,657,555.

(60) Provisional application No. 61/789,901, filed on Mar. 15, 2013.

(51) Int. Cl.
| | | |
|---|---|---|
| *E21B 43/10* | (2006.01) | |
| *F16L 13/14* | (2006.01) | |
| *F16L 15/00* | (2006.01) | |

(52) U.S. Cl.
CPC .......... *E21B 43/106* (2013.01); *E21B 43/103* (2013.01); *F16L 13/147* (2013.01); *F16L 15/003* (2013.01)

(58) Field of Classification Search
CPC .... E21B 43/106; E21B 43/103; E21B 17/042; E21B 17/08; E21B 17/043; E21B 43/108; F16L 13/168; F16L 15/003; F16L 15/004; F16L 15/008; F16L 15/04; F16L 13/147; F16L 15/009

See application file for complete search history.

(56) References Cited

U.S. PATENT DOCUMENTS

| | | | | |
|---|---|---|---|---|
| 6,409,175 B1 * | 6/2002 | Evans | ................... | E21B 17/042 277/314 |
| 7,086,669 B2 * | 8/2006 | Evans | ................... | E21B 17/042 285/333 |
| 7,240,928 B2 * | 7/2007 | Evans | ................ | E21B 17/0426 285/333 |
| 7,798,238 B2 * | 9/2010 | Evans | ................... | E21B 17/042 166/241.1 |
| 7,887,103 B2 * | 2/2011 | Evans | ................... | E21B 43/106 285/333 |
| 8,181,707 B2 * | 5/2012 | Evans | ................... | E21B 17/042 166/207 |

(Continued)

FOREIGN PATENT DOCUMENTS

CA 2469392 A1 * 6/2003 ............... C23C 8/26

*Primary Examiner* — Daniel P Stephenson
(74) *Attorney, Agent, or Firm* — Patterson + Sheridan, LLP

(57) ABSTRACT

An expandable tubular for use in a wellbore includes: a pin formed at a first longitudinal end of the expandable tubular; a box formed at a second longitudinal end of the expandable tubular; a tubular body connecting the pin and the box; and an elastomeric seal disposed in a groove of the box. Each of the pin and box has: a torque shoulder; and a thread. The pin has an asymmetric protrusion formed on an inner surface thereof.

18 Claims, 5 Drawing Sheets

(56) References Cited

U.S. PATENT DOCUMENTS

| | | | | |
|---|---|---|---|---|
| 9,657,555 B2* | 5/2017 | DeLange | | E21B 43/106 |
| 2004/0017081 A1* | 1/2004 | Simpson | | E21B 17/042 |
| | | | | 285/333 |
| 2005/0093250 A1* | 5/2005 | Santi | | E21B 17/042 |
| | | | | 277/602 |
| 2005/0127672 A1* | 6/2005 | Ellington | | E21B 43/106 |
| | | | | 285/382 |
| 2005/0184521 A1* | 8/2005 | Maguire | | E21B 43/106 |
| | | | | 285/374 |
| 2006/0006647 A1* | 1/2006 | Hashem | | E21B 43/103 |
| | | | | 285/333 |
| 2007/0024053 A1* | 2/2007 | Sivley, IV | | E21B 43/106 |
| | | | | 285/333 |
| 2007/0035130 A1* | 2/2007 | Hashem | | F16L 15/003 |
| | | | | 285/333 |
| 2007/0035131 A1* | 2/2007 | Benzie | | E21B 43/106 |
| | | | | 285/333 |
| 2007/0035132 A1* | 2/2007 | Benzie | | E21B 43/106 |
| | | | | 285/334 |
| 2007/0164565 A1* | 7/2007 | Evans | | F16L 15/008 |
| | | | | 285/333 |
| 2007/0257486 A1* | 11/2007 | Filippov | | E21B 43/106 |
| | | | | 285/382.2 |
| 2007/0272419 A1* | 11/2007 | Costa | | E21B 17/042 |
| | | | | 166/380 |
| 2009/0205839 A1* | 8/2009 | Cook | | E21B 43/103 |
| | | | | 166/382 |
| 2010/0052319 A1* | 3/2010 | Benzie | | F16L 15/04 |
| | | | | 285/382.2 |
| 2010/0132956 A1* | 6/2010 | LeBedz | | E21B 43/106 |
| | | | | 166/378 |
| 2010/0230958 A1* | 9/2010 | Holland | | E21B 43/103 |
| | | | | 285/333 |
| 2011/0220369 A1* | 9/2011 | DeLange | | E21B 43/105 |
| | | | | 166/382 |
| 2012/0286507 A1* | 11/2012 | Maillon | | F16L 15/06 |
| | | | | 285/334 |
| 2012/0325361 A1* | 12/2012 | Durivault | | E21B 17/0423 |
| | | | | 138/109 |
| 2014/0027118 A1* | 1/2014 | DeLange | | E21B 23/00 |
| | | | | 166/297 |
| 2014/0262213 A1* | 9/2014 | DeLange | | E21B 43/106 |
| | | | | 166/207 |

\* cited by examiner

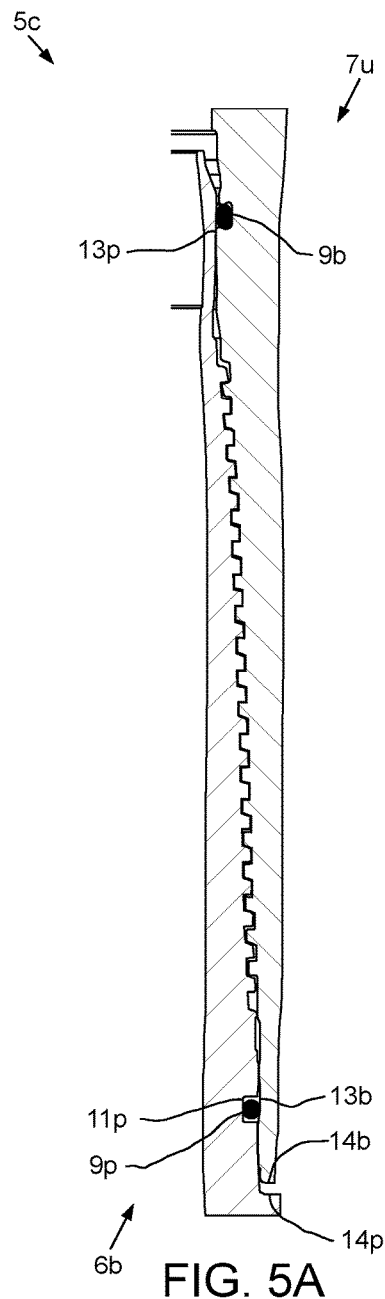
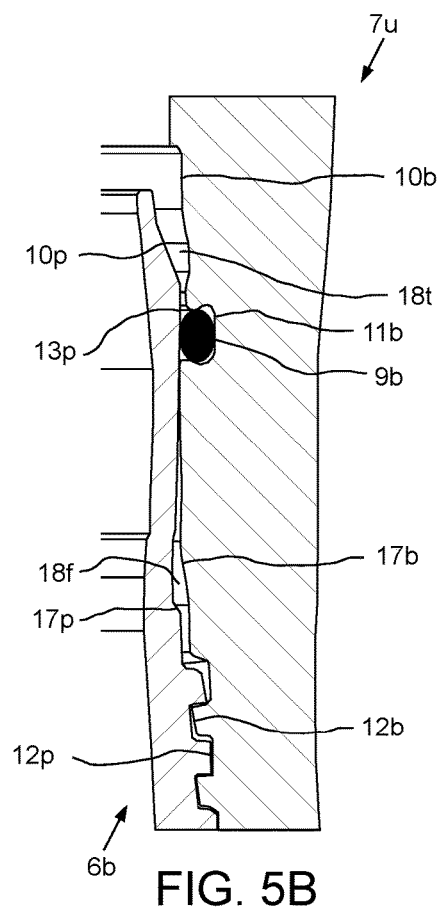
FIG. 5A
FIG. 5B

COUPLINGS FOR EXPANDABLE TUBULAR

BACKGROUND OF THE DISCLOSURE

Field of the Disclosure

The present disclosure relates to couplings for an expandable tubular.

Description of the Related Art

In the oil and gas exploration and production industry, expandable tubing has been developed and has a variety of uses. Expandable tubing offers a number of advantages over conventional borehole tubing, as the expandable tubing can be run into a borehole in an unexpanded state and subsequently expanded downhole. This allows the tubing to be run through existing tubing and then expanded to a larger diameter within the borehole.

FIG. 1A illustrates a connection 1 between two expandable tubulars before expansion thereof. FIG. 1B illustrates the connection 1 after expansion. The expandable tubing sections typically include a male threaded portion (pin) 2p and a female threaded portion (box) 2b at opposite ends, for joining adjacent sections of tubing together end to end. A seal 3 is engaged with the box 2b, thereby providing a fluid-tight seal. However, upon expansion of the connection, plastic deformation of the seal-groove area may cause the area to sag as shown in FIG. 1B. The seal 3 then contracts into the sagged base, thereby disengaging from the box 2b. Disengagement of the seal compromises the sealing integrity of the connection during and after expansion.

There exists a need in the art for an expandable connection which maintains sealing integrity before, during, and after expansion.

SUMMARY OF THE DISCLOSURE

The present disclosure relates to couplings for an expandable tubular. In one embodiment, an expandable tubular for use in a wellbore includes: a pin formed at a first longitudinal end of the expandable tubular; a box formed at a second longitudinal end of the expandable tubular; a tubular body connecting the pin and the box; and an elastomeric seal disposed in a groove of the box. Each of the pin and box has: a torque shoulder; and a thread. The pin has an asymmetric protrusion formed on an inner surface thereof.

In another embodiment, an expandable tubular connection for use in a wellbore includes: a pin made from a ductile steel or ductile corrosion resistant alloy and having a torque shoulder, a thread, a seal groove, a seal receptacle, a metallic seal face, and an asymmetric protrusion formed on an inner surface thereof; an elastomeric seal disposed in the pin seal groove; a box made from a ductile steel or ductile corrosion resistant alloy and having a torque shoulder, a thread, a seal groove, a seal receptacle, and a metallic seal face; and an elastomeric seal disposed in the box seal groove. A second end of the protrusion is adjacent to the box seal groove. A first end of the first protrusion is adjacent to an end of the box metallic seal face.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5A illustrates the connection after expansion. FIG. 5B is an enlargement of a portion of FIG. 5A.

DETAILED DESCRIPTION OF THE DISCLOSURE

Figure 1A:
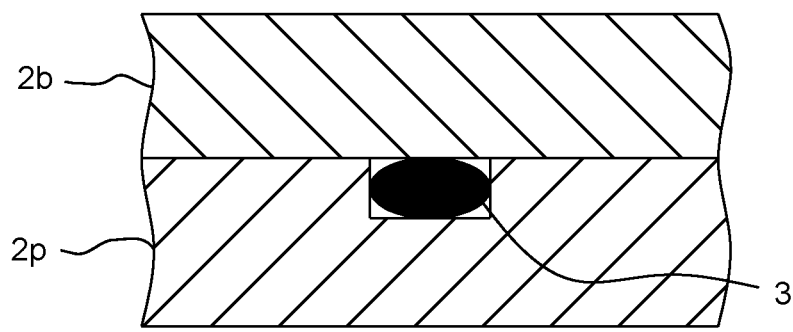
FIG. 1A illustrates a connection between two prior art expandable tubulars before expansion thereof.
Figure 1B:
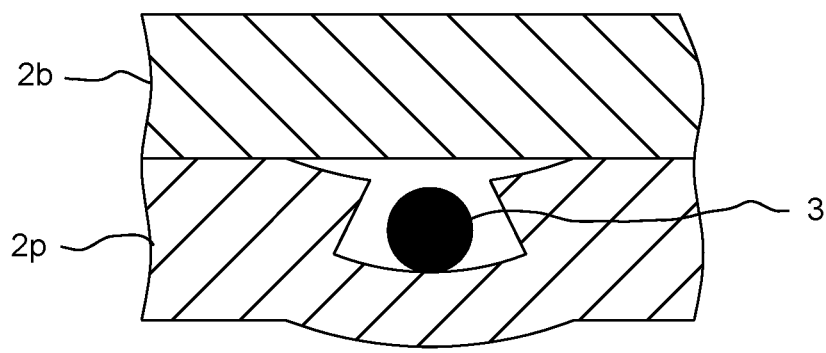
FIG. 1B illustrates the connection after expansion.
Figure 2:
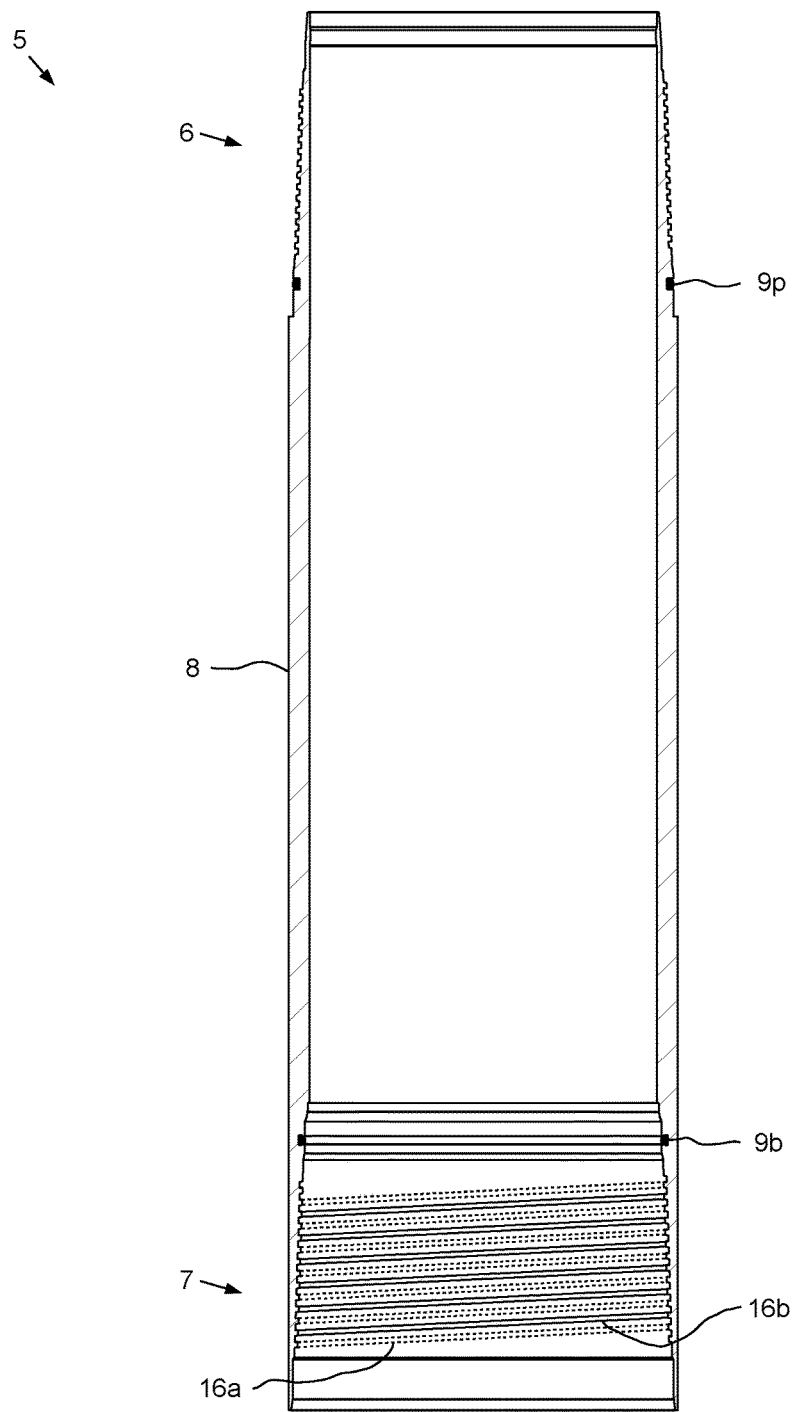
FIG. 2 illustrates an expandable tubular, according to one embodiment of the present disclosure.
Figure 3A:
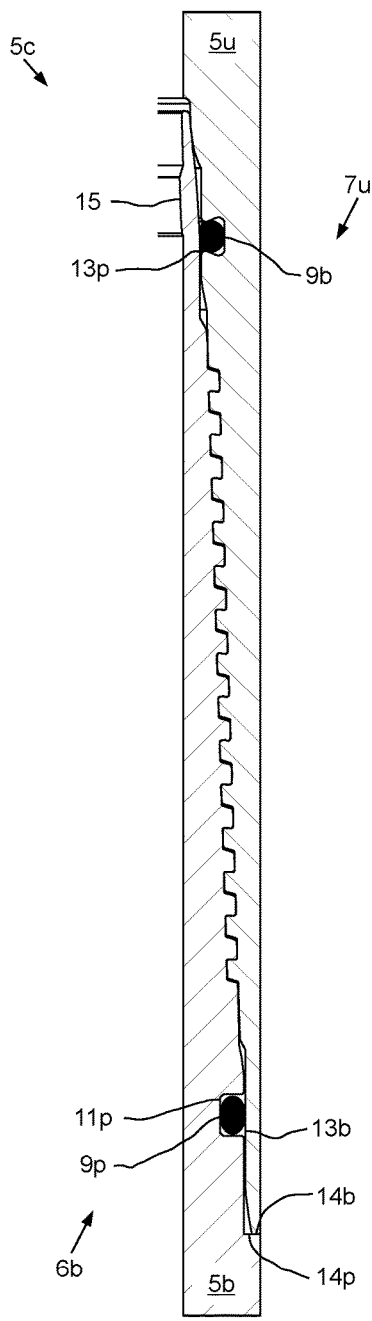
FIG. 3A illustrates a connection between two of the expandable tubulars.
Figure 3B:
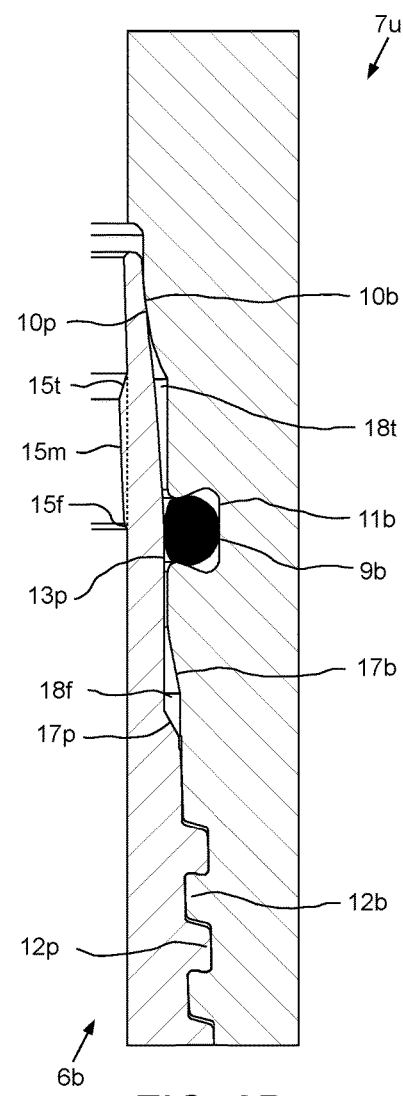
FIG. 3B is an enlargement of a portion of FIG. 3A.

FIG. 2 illustrates an expandable tubular 5, according to one embodiment of the present disclosure. FIG. 3A illustrates a connection 5c between two 5u,b (FIG. 4) of the expandable tubulars 5. FIG. 3B is an enlargement of a portion of FIG. 3A. Each expandable tubular 5 may be a solid expandable tubular, such as casing or liner. Alternatively, each tubular 5 may be perforated, such as a slotted liner or a base of a multi-layer expandable sand screen.

Each expandable tubular 5 may include the pin 6 formed at an upper longitudinal end thereof, the box 7 formed at a lower longitudinal end thereof, a body 8 connecting the pin and the box, and one or more seals, such as an o-ring $9p$ carried by the pin and an o-ring $9b$ carried by the box. The pin 6, the box 7, and the body 8 may each be made of a ductile material capable of sustaining plastic deformation, such as a metal or alloy (i.e., steel). The seals $9p,b$ may each be made from an elastomeric material, such as an elastomer, an engineering thermoplastic, or a copolymer thereof. The pin 6, box 7, and body 8 may be integrally formed from a blank tubular (not shown). The box 7 may be formed by expanding, such as by swaging, an end of the blank tubular. The swaged end may then be stress relieved and the box profile machined into an inner surface of the blank tubular. Alternatively, the pin and/or box may be welded to the body. Alternatively, the metal or alloy may be corrosion resistant, such as stainless steel or a nickel based alloy.

Figure 4:
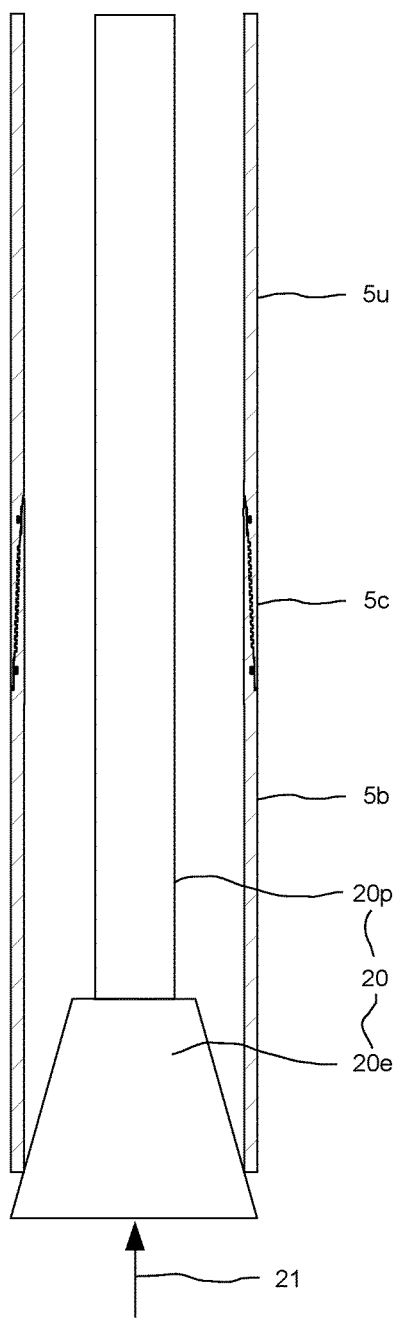
FIG. 4 illustrates expansion of the connection.

The expandable tubulars $5u,b$ may be connected together at a surface of a wellbore according to normal stab-in and threading procedures to form a string of expandable tubing. The stab-in procedures can be performed with tubulars arranged in a pin up and a box down configuration. The made up expandable tubulars $5u,b$ may then be deployed into the wellbore to a desired depth on a workstring 20 (FIG. 4). The workstring 20 may include a string of drill pipe $20p$ and an expander, such as a cone $20e$.

Alternatively, each tubular 5 may have pins at both ends thereof and a separate coupling (not shown) having two box ends may be used to assemble the tubulars $5u,b$. Alternatively, the tubulars may be connected in a box up and pin down configuration. Alternatively, the expander may be a rotary expansion tool having pressure actuated rollers. Alternatively, coiled tubing may be used instead of the drill pipe.

The connection $5c$ may include the pin $6b$ of the lower tubular $5b$ screwed together with the box $7u$ of the upper tubular 5u and one or more extrusion gaps, such as a leading gap 18f and a trailing gap 18t. Each box 7 may include a metallic seal face 10b, a seal groove 11b, a thread 12b, a seal receptacle 13b, a torque shoulder 14b, and an extrusion taper 17b. Each pin 6 may be complementary to the respective box 7 and may include a metallic seal face 10p, a seal groove 11p, a thread 12p, a seal receptacle 13p, a torque shoulder 14p, a protrusion 15, and an extrusion taper 17p.

The metallic seal face 10p may be formed in an outer surface of the pin 6 and be located at end thereof distal from the body 8. The metallic seal face 10b may be formed in an inner surface of the box 7 and may form an end thereof adjacent to the body 8. The seal faces 10b,p may be sized to form a radial interference fit during makeup for providing pressure integrity during deployment into the wellbore and during expansion. Each metallic seal face 10b,p may taper such that the respective pin and box thickness increases from the respective distal end thereof the toward the body 8.

Each torque shoulder 14b,p may be formed in an outer surface of the respective box 7 and pin 6 and be perpendicular to a longitudinal axis of the tubulars 5u,b. The torque shoulder 14b of the box 7 may be located at an end thereof distal from the body 8 and the torque shoulder 14p of the pin 6 may form an end thereof adjacent to the body 8. External location of the torque shoulders 14b,p may allow for visual inspection of the engaged shoulders after makeup.

The pin groove 11p may be formed in an outer surface of the pin 6 and located between the torque shoulder 14p and the thread 12p. The box groove 11b may be formed in an inner surface of the box 7 and located between the thread 12b and the metallic seal face 10b. The box groove 11b may further have a trapezoidal cross section to retain the o-ring 9b therein. The pin receptacle 13p may be formed in an outer surface of the pin 6 and located between the metallic seal face 10p and the thread 12p. The box receptacle 13b may be formed in an inner surface of the box 7 and located between the torque shoulder 14b and the thread 12b.

Each thread 12b,p may have a tapered form such that the respective pin and box thickness increases from a respective end thereof distal from the body 8 toward the body. The tapered threadform may facilitate stabbing and makeup and maximize compressive and/or tensile strength of the connection 5c. Each thread 12b,p may also have a hooked tension flank form to discourage separation during expansion and deployment into the wellbore. Each thread 12b,p may also have a multi-start form, such as a double start 16a,b form, to reduce wear on the o-rings 9b,p during makeup of the connection 5c.

The extrusion taper 17p may be formed in an outer surface of the pin 6 and located between the seal receptacle 13p and the thread 12p. The extrusion taper 17b may be formed in an inner surface of the box 7 and located between the groove 11b and the thread 12b. Each extrusion taper 17b,p may taper such that the respective pin and box thickness increases from the respective distal end thereof the toward the body 8. The leading extrusion gap 18f may be formed between the pin extrusion taper 17p and the box seal groove 11b. The trailing extrusion gap 18t may be formed between an engaged portion of the metallic seal faces 10b,p and the box seal groove 11b.

The protrusion 15 may be formed on an inner surface of the pin 6 located adjacent to the trailing extrusion gap 18t and adjacent to the distal end thereof. A lower/leading end of the protrusion 15 may be aligned with a lower end of the metallic seal face 10p and a centerline of the box groove 11b. An upper/trailing end of the protrusion 15 may be aligned with a lower end of the box seal face 10b. The protrusion may be asymmetric and formed by a leading taper 15f, a mid taper 15m, and a trailing taper 15t. The leading and trailing tapers 15f,t may each be sharp and the mid taper 15m may be gradual. The mid taper 15m may have a length substantially greater than respective lengths of the leading and trailing tapers 15f,t. The trailing taper 15t may taper such that the pin thickness increases from the distal end thereof toward the body 8 and the mid and leading tapers 15f,m may taper such that the pin thickness decreases from the distal end thereof toward the body 8. Alternatively, the leading taper 15f may be omitted.

FIG. 4 illustrates expansion of the connection 5c. When operated, the cone 20e may radially expand the tubulars 5u,b (including the connection 5c) to a larger diameter. The cone 20e may be forced upward 21 in the wellbore by applying pressure below the cone and/or pulling on the drill pipe 20p attached to the cone. A dart (not shown) may be coupled to the cone 20e to provide sealing engagement with an inner wall of the expandable tubulars 5u,b. Alternatively, the cone 20e may be forced through the expandable string solely by pulling on the drill pipe 5p from the surface. When the expansion tool reaches the connection 5c between the tubulars 5u,b, the pin 6b of the lower tubular 5b is driven into the box 7u of the upper tubular 5u.

FIG. 5A illustrates the connection after expansion. FIG. 5B is an enlargement of a portion of FIG. 5A. The metallic seal faces 10b,p may disengage during expansion. Even though the protrusion 15 is located adjacent to the trailing gap 18t, the protrusion serves to maintain the integrity of the leading gap 18f (portion adjacent to the box seal groove 11b) during and after expansion. Although the trailing gap 18t is further opened by expansion, unidirectional sealing by the box o-ring 9b is maintained. The box o-ring 9b is still effective for sealing against higher pressure in the tubing string bore than the wellbore annulus. The pin o-ring 9p serves to seal against an opposite pressure differential of higher pressure in the wellbore annulus than the tubing string bore. Therefore, bidirectional sealing capability of the connection 5c is maintained during and after expansion.

Alternatively, for some applications, a unidirectional seal may be sufficient and the pin o-ring and groove may be omitted. Alternatively, the metallic seal faces of the pin and box may be omitted.

The connection 5c may be especially beneficial for larger expandable tubulars, i.e. having a nominal size greater than or equal to six inches.

Figure 6:
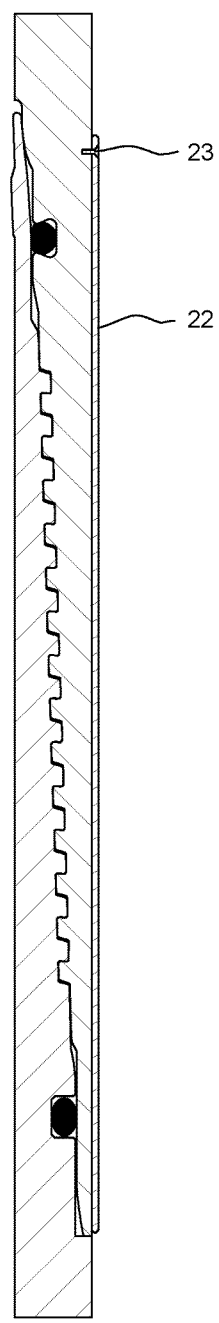
FIG. 6 illustrates a protector sleeve usable with the connection, according to another embodiment of the present disclosure.

FIG. 6 illustrates a protector, such as a sleeve 22, usable with the connection, according to another embodiment of the present disclosure. The protective sleeve 22 may be connected to the box 7, such as by one or more fasteners 23. Alternatively, the sleeve may be connected to the box by an adhesive or by thermal fit. Alternatively, the sleeve may have a tab mechanically trapped between the pin and box during makeup. Alternatively, the protector may be an applied coating whose surface hardness may or may not be harder than the surface hardness of the box.

While the foregoing is directed to embodiments of the present disclosure, other and further embodiments of the disclosure may be devised without departing from the basic scope thereof, and the scope of the invention is determined by the claims that follow.

What is claimed is:

1. An expandable tubular for use in a wellbore, comprising:
   a pin formed at a first longitudinal end of the expandable tubular;

a box formed at a second longitudinal end of the expandable tubular;
a tubular body connecting the pin and the box; and
an elastomeric seal disposed in a groove of the box, wherein:
each of the pin and box has:
a torque shoulder;
a metallic seal face; and
a thread; and
wherein the metallic seal face of the pin is located at an end thereof distal from the body,
wherein the pin has an asymmetric protrusion formed on an inner surface thereof and located at the distal pin end,
wherein the pin includes a receptacle for receiving the elastomeric seal, and the pin receptacle is located between the pin metallic seal face and the pin thread, and
wherein the pin has an extrusion taper formed in an outer surface thereof and located between the pin thread and the pin receptacle.

2. The tubular of claim 1, wherein:
the torque shoulder of the box is located at an end thereof distal from the body,
the torque shoulder of the pin forms an end thereof adjacent to the body.

3. The tubular of claim 2,
further comprising an elastomeric seal disposed in a groove of the pin,
wherein:
the groove of the pin is located between the pin torque shoulder and the pin thread,
the box further has a receptacle for receiving the elastomeric seal of the pin, and
the box receptacle is located between the box torque shoulder and the box thread.

4. The tubular of claim 1, wherein the groove of the box is located between the box thread and the box metallic seal face.

5. The tubular of claim 4, wherein:
the box further has an extrusion taper formed in an inner surface thereof and located between the box thread and the box groove.

6. An expandable tubular connection, comprising:
a first tubular of claim 5; and
a second tubular of claim 5,
wherein:
the first pin is screwed together with the second box,
a first extrusion gap is formed between the first pin extrusion taper and the second box seal groove, and
a second extrusion gap is formed between an engaged portion of the metallic seal faces and the second box seal groove.

7. The connection of claim 6, wherein:
the first protrusion is located adjacent to the second extrusion gap,
a second end of the first protrusion is adjacent to the second box seal groove, and
a first end of the first protrusion is adjacent to an end of the second box metallic seal face.

8. The tubular of claim 1, wherein:
the protrusion is located adjacent to an end of the pin distal from the body,
the protrusion has a first end taper, a mid taper, and a second end taper,
the end tapers are sharp and the mid taper is gradual, and
a length of the mid taper is substantially greater than lengths of the end tapers.

9. An expandable tubular connection, comprising:
a first tubular having a pin having threads;
a second tubular having a box having threads connected to the threads of the pin, and the box sealingly engages a distal portion of the pin;
the box including a seal groove;
a first extrusion gap formed between the threads of the pin and the seal groove, and
a second extrusion gap formed between the distal portion of the pin and the seal groove;
the pin having an asymmetric protrusion formed on an inner surface of the pin, wherein the asymmetric protrusion is disposed between the threads and the distal portion of the pin and is disposed laterally adjacent to the second extrusion gap.

10. The connection of claim 9, wherein:
a second end of the protrusion is located laterally adjacent to the seal groove, and
a first end of the protrusion is a located laterally adjacent to an end of the second box metallic seal face.

11. The connection of claim 9, wherein the protrusion has a first end taper, a mid taper, and a second end taper.

12. The connection of claim 11, wherein the end taper is sharp and the mid taper is gradual, and a length of the mid taper is substantially greater than lengths of the end tapers.

13. The connection of claim 9, further comprising an elastomeric seal disposed in the seal groove.

14. The connection of claim 9, wherein a distance between the distal portion of the pin and the seal groove is free of threads.

15. The connection of claim 9, wherein the distal portion of the pin includes a metallic seal face for sealingly engaging a metallic seal face of the box.

16. The connection of claim 15, wherein upon expansion, the metallic sealing face of the pin disengages from the metallic seal face of the box, and the pin maintains a seal with a sealing material disposed in the seal groove.

17. The connection of claim 15, wherein upon expansion, the second extrusion gap enlarges, and the pin maintains a seal with a sealing material disposed in the seal groove.

18. An expanded tubular connection, comprising:
a first tubular having a pin having threads;
a second tubular having a box having threads connected to the threads of the pin;
the box including a seal groove and a sealing material disposed in the seal groove;
a first extrusion gap formed between the threads of the pin and the seal groove, and
a second extrusion gap formed between a distal portion of the pin and the seal groove,
wherein a length of the pin from the second extrusion gap to the distal portion of the pin is not engaged with the box, and wherein the pin sealingly engages the sealing material.

* * * * *